(12) United States Patent
Satou et al.

(10) Patent No.: US 9,551,603 B2
(45) Date of Patent: Jan. 24, 2017

(54) ULTRASONIC FLOW METER DEVICE

(71) Applicant: Panasonic Intellectual Property Management Co., Ltd., Osaka-shi, Osaka (JP)

(72) Inventors: Masato Satou, Nara (JP); Hidetomo Nagahara, Kyoto (JP); Yuji Fujii, Nara (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 0 days.

(21) Appl. No.: 14/898,647

(22) PCT Filed: Jun. 13, 2014

(86) PCT No.: PCT/JP2014/003172
§ 371 (c)(1),
(2) Date: Dec. 15, 2015

(87) PCT Pub. No.: WO2014/203510
PCT Pub. Date: Dec. 24, 2014

(65) Prior Publication Data
US 2016/0146650 A1    May 26, 2016

(30) Foreign Application Priority Data
Jun. 19, 2013  (JP) .................................. 2013-128225

(51) Int. Cl.
*G01F 1/66*   (2006.01)

(52) U.S. Cl.
CPC ................ *G01F 1/66* (2013.01); *G01F 1/662* (2013.01)

(58) Field of Classification Search
CPC ..................................... G01F 1/66; G01F 1/20
(Continued)

(56) References Cited

U.S. PATENT DOCUMENTS

| 6,748,811 B1 * | 6/2004 | Iwanaga | G01F 1/662 73/861.18 |
| 8,161,824 B2 * | 4/2012 | Satou | G01F 1/662 73/861.27 |

(Continued)

FOREIGN PATENT DOCUMENTS

| JP | 2005-257444 A | 9/2005 |
| JP | 2006-038627 A | 2/2006 |

(Continued)

OTHER PUBLICATIONS

International Search Report, and English translation thereof, in corresponding International Application No. PCT/JP2014/003172 dated Sep. 9, 2014, 3 pages.

(Continued)

*Primary Examiner* — Jewel V Thompson
(74) *Attorney, Agent, or Firm* — Brinks Gilson & Lione (57) ABSTRACT

An ultrasonic flow meter device comprises a fluid passage forming section including a measurement fluid passage, and an opening facing a bottom surface of the measurement fluid passage; a pair of ultrasonic transducers which transmit and receive an ultrasonic wave via the opening; a partition plate which partitions the measurement fluid passage; and an identification section provided on an end surface of the partition plate and used to identify an obverse surface and a reverse surface of the partition plate.

4 Claims, 7 Drawing Sheets

(58) Field of Classification Search
USPC .................... 73/861.25, 861.18, 28, 861.27
See application file for complete search history.

(56) References Cited

U.S. PATENT DOCUMENTS

| | | | | |
|---|---|---|---|---|
| 8,701,501 | B2* | 4/2014 | Miyata | ................... G01F 1/667 |
| | | | | 73/861.18 |
| 2013/0239699 | A1 | 9/2013 | Ozaki et al. | |
| 2015/0253166 | A1* | 9/2015 | Yasuda | ................... G01F 1/662 |
| | | | | 73/861.31 |

FOREIGN PATENT DOCUMENTS

| | | |
|---|---|---|
| JP | 2009-014672 A | 1/2009 |
| JP | 2010-127811 A | 6/2010 |
| JP | 2012-103149 A | 5/2012 |

OTHER PUBLICATIONS

Extended Search Report in corresponding European Application No. 14813895.1, dated Jul. 5, 2016, 7 pages.

* cited by examiner

ULTRASONIC FLOW METER DEVICE

This application is a 371 application of PCT/JP2014/003172 having an international filing date of Jun. 13, 2014, which claims priority to JP 2013-128225 filed Jun. 19, 2013, the entire contents of which are incorporated herein by reference.

TECHNICAL FIELD

The present invention relates to an ultrasonic flow meter device which measures the flow rate of a fluid flowing through a plurality of flat fluid passages into which a measurement fluid passage is divided by partition plates, by use of an ultrasonic flow meter.

BACKGROUND ART

Figure 6:
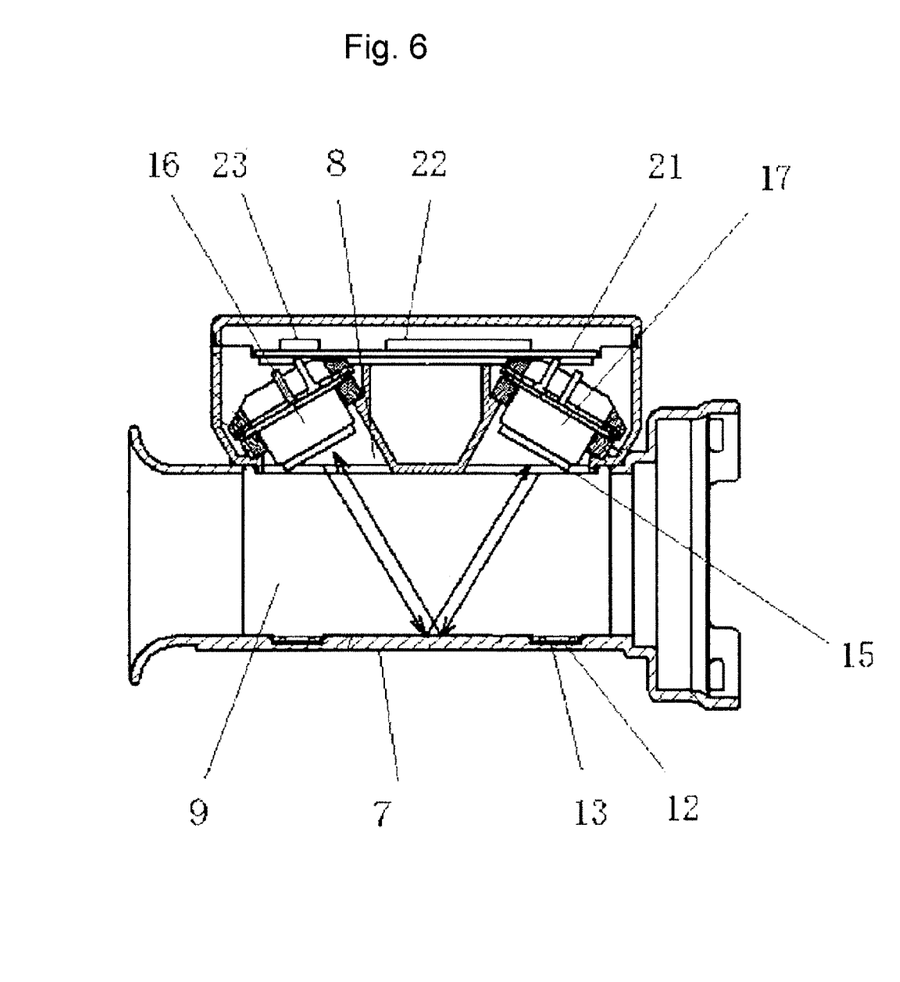
FIG. 6 is a cross-sectional showing a conventional ultrasonic flow meter device.
Figure 7:
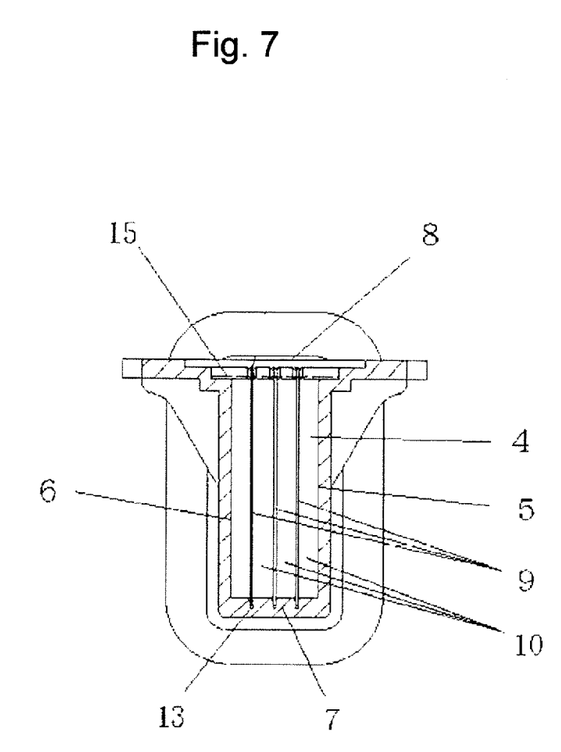
FIG. 7 is a cross-sectional view showing a conventional ultrasonic flow meter device.

As a conventional example of an ultrasonic flow meter device, an ultrasonic flow meter device disclosed in Patent Literature 1 is known. For example, as shown in FIGS. 6 and 7, partition plates 9 are inserted into a fluid passage 4 through an opening 8 and partition the fluid passage 4 into a plurality of flat fluid passages 10.

CITATION LIST

Patent Literature

Patent Literature 1: Japanese Laid-Open Patent Application Publication No. 2012-103149

SUMMARY OF INVENTION

Technical Problem

Commonly, the partition plates 9 are manufactured by punching of a roll material made of SUS. In this case, warpage or burr is generated in the partition plates 9. Therefore, treatment for removing the warpage or the burr is performed. However, in some cases, warpage or burr which is invisible is left. Even such slight warpage or burr affects the flow of the fluid along the partition plates 9.

If the partition plates 9 are inserted into the fluid passage 4 in a state in which the directions of obverse surfaces do not conform to each other and the directions of reverse surfaces do not conform to each other, the effects of the warpage or the burr are varied among the flat fluid passages 10. Under the circumstances, a flow velocity distribution is varied among the flat fluid passages 10, and the non-uniformity of the flow rate among flow meter devices occurs.

The present invention has been developed to solve the above-described problem, and an object of the present invention is to provide an ultrasonic flow meter device which can reduce the non-uniformity of the flow rate which occurs among the flow meter devices.

Solution to Problem

According to an aspect of the present invention, an ultrasonic flow meter comprises a fluid passage forming section including a measurement fluid passage, and an opening facing a bottom surface of the measurement fluid passage; a pair of ultrasonic transducers which transmit and receive an ultrasonic wave via the opening; a partition plate which partitions the measurement fluid passage; and an identification section provided on an end surface of the partition plate and used to identify an obverse surface and a reverse surface of the partition plate.

Advantageous Effects of Invention

The present invention has the above-described configuration, and can achieve an advantage that an ultrasonic flow meter device capable of reducing the non-uniformity of a flow rate among flow meter devices can be obtained.

DETAILED DESCRIPTION OF THE PREFERRED EMBODIMENTS

A first invention provides an ultrasonic flow meter device comprising: a fluid passage forming section including a measurement fluid passage, and an opening facing a bottom surface of the measurement fluid passage; a pair of ultrasonic transducers which transmit and receive an ultrasonic wave via the opening; a partition plate which partitions the measurement fluid passage; and an identification section provided on an end surface of the partition plate and used to identify an obverse surface and a reverse surface of the partition plate.

In a second invention, in the ultrasonic flow meter device according to the first invention, the identification section may be placed outside of the measurement fluid passage.

In a third invention, the ultrasonic flow meter device according to the second invention, further comprises a sheet covering the opening, wherein the sheet includes a first aperture through which the ultrasonic wave transmitted from the ultrasonic transducer travels, and a second aperture through which the ultrasonic wave reflected on the bottom surface of the measurement fluid passage travels, and wherein the identification section is a convex section protruding through one of the first aperture and the second aperture.

In a fourth invention, the ultrasonic flow meter device according to the first invention further comprises a sheet covering the opening, wherein the sheet includes a first aperture through which the ultrasonic wave transmitted from the ultrasonic transducer travels, and a second aperture through which the ultrasonic wave reflected on a bottom surface of the measurement fluid passage travels, and wherein the identification section is a recess section facing one of the first aperture and the second aperture.

Hereinafter, the embodiment of the present invention will be described with reference to the drawings. Note that the present invention is not limited to the embodiment.

Embodiment

Figure 1:
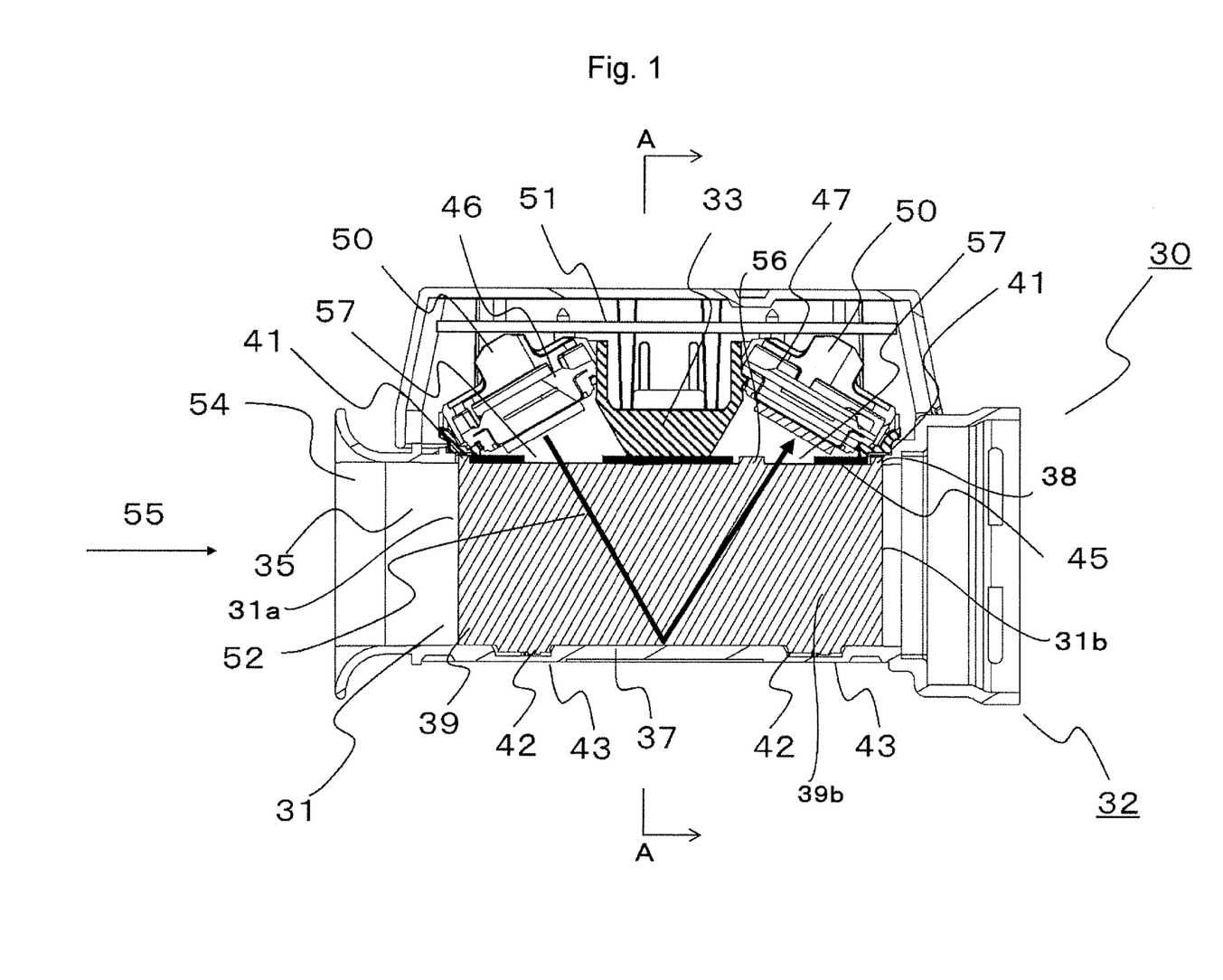
FIG. 1 is a cross-sectional view showing an ultrasonic flow meter device according to the embodiment of the present invention.

FIG. 1 is a cross-sectional view showing an ultrasonic flow meter device 30 according to the embodiment. As shown in FIG. 1, the ultrasonic flow meter device 30 includes a fluid passage block 32, a sensor block 33, a pair of ultrasonic transducers 46, 47, and a substrate (board) 51.

The fluid passage block 32 is a fluid passage forming section for forming a fluid passage (measurement fluid passage) 31 which measures the flow rate of a fluid. The fluid passage block 32 includes inside thereof, an inlet 31a, an outlet 31b, and a measurement fluid passage 31. The measurement fluid passage 31 has a rectangular cross-section. One end of the measurement fluid passage 31 is connected to the inlet 31a, while the other end (opposite end) of the measurement fluid passage 31 is connected to the outlet 31b. An inlet wall surface 54 which is a curved surface is provided on an upstream side of the inlet 31a.

The fluid passage block 32 further includes a bottom plate 37 and an opening 38. The bottom plate 37 is perpendicular to the inlet 31a and the outlet 31b. The inner surface of the bottom plate 37 is a flat surface, and defines the bottom surface of the measurement fluid passage 31. The bottom plate 37 is provided with a plurality of grooves 43. The grooves 43 are recesses of a rectangular parallelepiped shape. The two grooves 43 arranged along the flow direction (arrow 55) in the measurement fluid passage 31 are placed to be spaced apart from each other and extend linearly.

The opening 38 has a rectangular shape, and is perpendicular to the inlet 31a and the outlet 31b. The opening 38 is placed to face the bottom plate 37. The opening 38 is covered by a sheet 45.

The sheet 45 is formed of a resin sheet, a metal mesh, a resin mesh, a foam resin, etc. The sheet 45 is provided with two apertures 57. Each of the apertures 57 is a hole through which an ultrasonic wave transmitted from each of the ultrasonic transducers 46, 47 travels. The aperture 57 located on an upstream side and the aperture 57 located on a downstream side are placed to be spaced apart from each other along the flow direction in the measurement fluid passage 31. One of the upstream aperture 57 and the downstream aperture 57 is a first aperture and the other of them is a second aperture.

Partition plates 39 are placed in the measurement fluid passage 31. Each of the partition plates 39 has a rectangular flat plate shape, and includes an obverse surface 39a (FIG. 2), a reverse surface 39b, an upper end surface, a lower end surface, an upstream end surface, and a downstream end surface. The height of the partition plate 39 (length between the upper end surface and the lower end surface) is equal to the height of the measurement fluid passage 31 (length of the fluid passage block 32 between the bottom plate 37 and the opening 38). The length of the partition plate 39 (length between the upstream end surface and the downstream end surface) is equal to the length of the measurement fluid passage 31.

The obverse surface 39a (FIG. 2) and the reverse surface 39b of the partition plate 39 face each other. The upstream end surface faces the inlet 31a, while the downstream end surface faces the outlet 31b. The upper end surface faces the opening 38, and includes, for example, two upper projections 41 and convex sections 56. The upper projections 41 are provided to protrude upward from the corners of the upstream end and downstream end of the partition plate 39.

The convex sections 56 are identification sections by which the obverse surfaces 39a (FIG. 2) and the reverse surfaces 39b of the partition plates 39 can be identified. Each of the convex sections 56 has a rectangular shape, and protrudes upward from the upper end surface. The convex sections 56 are placed on the partition plates 39 in non-symmetric positions with respect to a center line between the upstream end and the downstream end. In the present embodiment, the convex sections 56 are placed to be closer to the downstream upper projection 41 rather than the upstream upper projection 41, between the two upper projections 41.

The convex sections 56 protrude upward through the opening 38 and via the downstream aperture 57. In this case, the convex sections 56 are not located in the center portion of the downstream aperture 57. Instead, the convex sections 56 are located in the vicinity of the upstream edge of the downstream aperture 57. In this configuration, the convex sections 56 are located to be distant from a propagation path of the ultrasonic wave transmitted from the ultrasonic transducer 46, 47 (away from the center of the propagation path).

The lower end surface faces the bottom plate 37, and includes, for example, two lower projections 42. The two lower projections 42 are spaced apart from each other and face the grooves 43 of the bottom plate 37, respectively. The lower projections 42 protrude downward from the lower end surface and are inserted into the grooves 43, respectively. In this way, the lower ends of the partition plates 39 are supported by the edges of the grooves 43, respectively.

The sensor block 33 is used to attach the first ultrasonic transducer 46 and the second ultrasonic transducer 47 to the measurement fluid passage 31. The sensor block 33 is placed on the fluid passage block 32 with the sheet 45 interposed between the sensor block 33 and the fluid passage block 32. The sensor block 33 is provided with fastening members 50 by which the pair of ultrasonic transducers 46, 47 are fastened to the measurement fluid passage 31 at fixed angles, respectively.

The first ultrasonic transducer 46 on the upstream side is directed to the downstream side relative to a direction perpendicular to a flow direction (arrow 55) in a state in which the first ultrasonic transducer 46 is fastened to the fastening member 50. The second ultrasonic transducer 47 on the downstream side is directed to the upstream side relative to the direction perpendicular to the flow direction in a state in which the second ultrasonic transducer 47 is fastened to the fastening member 50. In this configuration, the first ultrasonic transducer 46 and the second ultrasonic transducer 47 can mutually transmit and receive the ultrasonic wave as indicated by an arrow 52 in FIG. 1.

The first ultrasonic transducer 46 faces the upstream aperture 57 of the sheet 45. The second ultrasonic transducer 47 faces the downstream aperture 57 of the sheet 45. The outer peripheral surfaces of the ultrasonic transducers 46, 47 are covered by elastic bodies, respectively. Since the elastic bodies are interposed between the ultrasonic transducers 46, 47 and the sensor block 33, it becomes possible to prevent a vibration of each of the ultrasonic transducers 46, 47 from being transmitted to the sensor block 33. Thus, a noise can be mitigated.

The substrate 51 is electrically connected to the ultrasonic transducers 46, 47 and fastened to the sensor block 33. A measurement circuit section (not shown) and a calculation circuit section (not shown) are mounted on the substrate 51. The measurement circuit section measures a time for which the ultrasonic wave travels between the pair of ultrasonic transducers 46, 47 based on the outputs of the ultrasonic transducers 46, 47. The calculation circuit section calculates the flow rate based on the output of the measurement circuit section.

Figure 2:
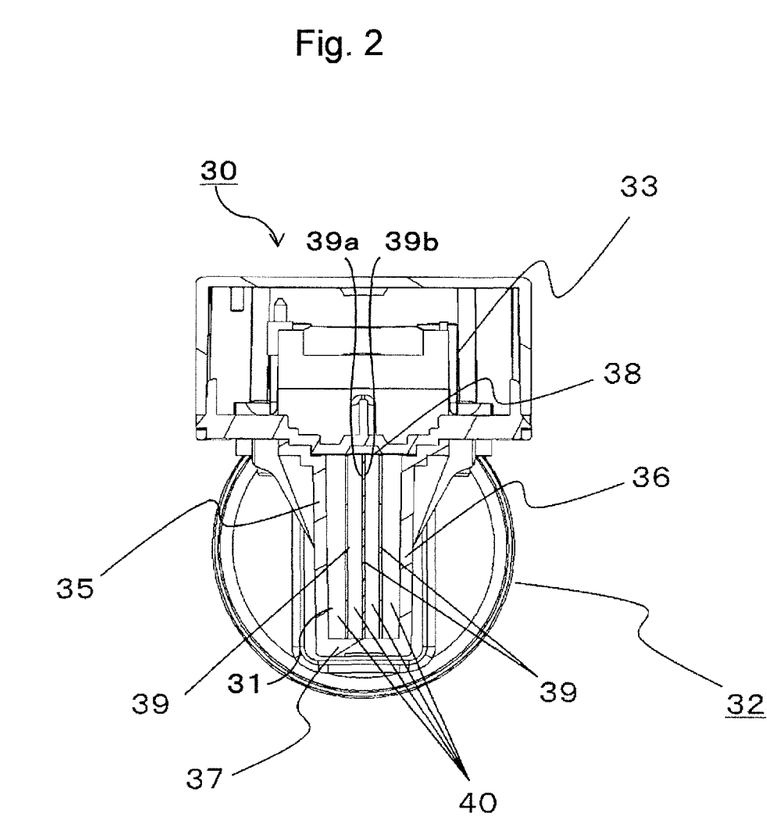
FIG. 2 is a cross-sectional view showing the ultrasonic flow meter device which is taken along line A- of FIG. 1.

FIG. 2 is a cross-sectional view showing the ultrasonic flow meter device 30 which is taken along line A-A of FIG. 1. As shown in FIG. 2, the fluid passage block 32 further includes a first side wall 35 and a second side wall 36. The first side wall 35 and the second side wall 36 face each other and extend in a direction perpendicular to the bottom plate 37. The side walls 35, 36 define the side surface of the measurement fluid passage 31 and have a rectangular cross-section of the measurement fluid passage 31.

The obverse surface 39a and the reverse surface 39b of each of the partition plates 39 are provided in parallel with the side walls 35, 36, respectively, and placed inside of the measurement fluid passage 31. For example, the obverse surface 39a of the partition plate 39 faces the first side wall 35, while the reverse surface 39b of the partition plate 39 faces the second side wall 36. The plurality of (in the present embodiment, three) partition plates 39 partition the measurement fluid passage 31 into a plurality of (in the present embodiment, four) flat fluid passages 40. The partition plates 39 are placed at equal intervals between the first side wall 35 and the second side wall 36.

Figure 3:
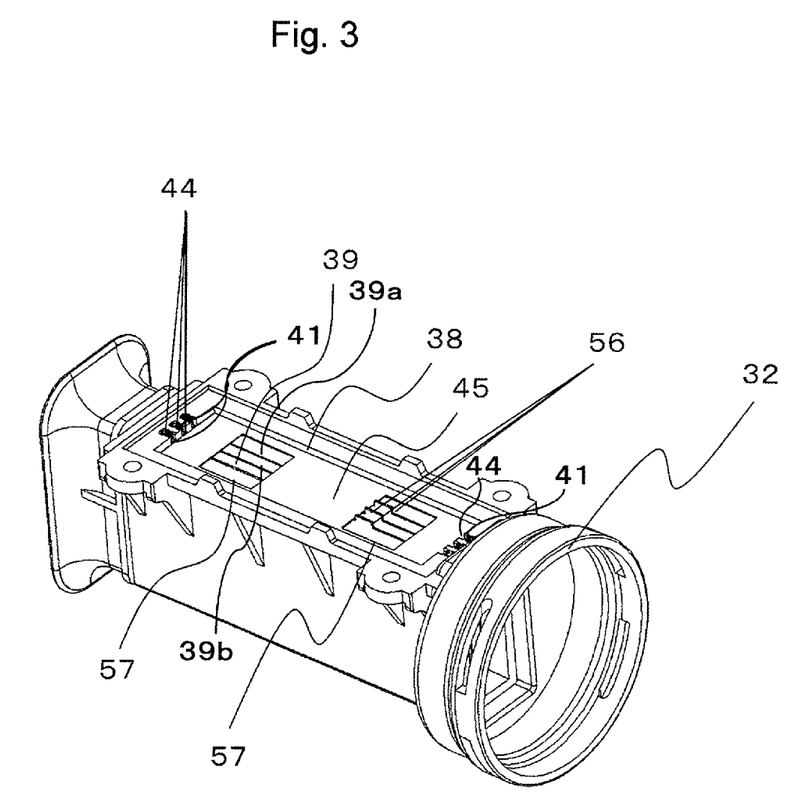
FIG. 3 is a perspective view showing a fluid passage block to which a sheet of FIG. 1 is attached.

FIG. 3 is a perspective view showing the fluid passage block 32 to which the sheet 45 is attached. As shown in FIG. 3, on the upstream edge of the upper side of the fluid passage block 32, a plurality of (in the present embodiment, three) upstream grooves 44 are provided. The upstream grooves 44 are placed in parallel with each other at equal intervals, and are in communication with the opening 38. The upstream upper projections 41 of the partition plates 39 are inserted into the upstream grooves 44, respectively. In this way, the upstream ends of the partition plates 39 are supported by the edges of the grooves 44, respectively.

In addition, on the downstream edge of the upper side of the fluid passage block 32, a plurality of (in the present embodiment, three) downstream grooves 44 are provided. The downstream grooves 44 are placed in parallel with each other at equal intervals, and are in communication with the opening 38. The downstream grooves 44 are placed to face the upstream grooves 44, respectively. The downstream upper projections 41 of the partition plates 39 are inserted into the downstream grooves 44, respectively. In this way, the downstream ends of the partition plates 39 are supported by the edges of the grooves 44, respectively.

Figure 4:
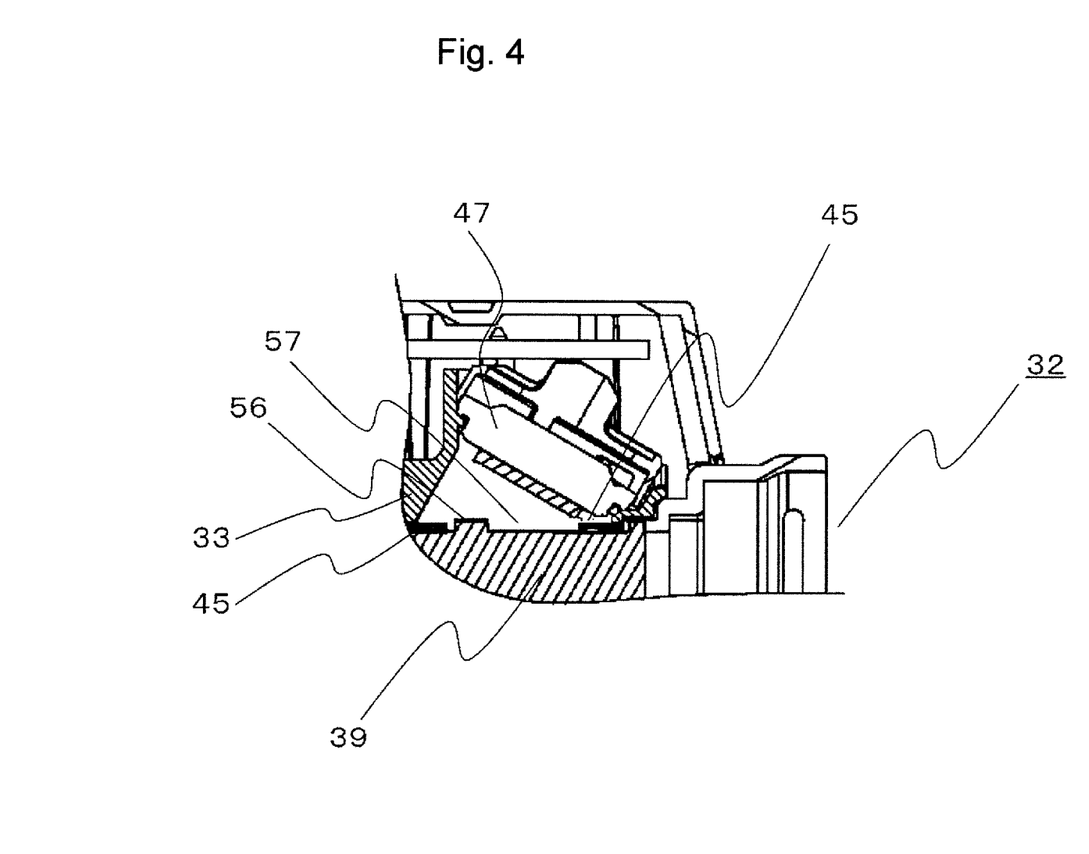
FIG. 4 is a cross-sectional view showing a portion of the ultrasonic flow meter device of FIG. 1.

Next, the procedure for assembling the ultrasonic flow meter device 30 will be described with reference to FIGS. 1 to 4. FIG. 4 is an enlarged cross-sectional view showing a portion of the ultrasonic flow meter device 30. As shown in FIGS. 1 to 4, the partition plates 39 are inserted into the measurement fluid passage 31 through the opening 38 while inserting the both end portions of each of the partition plates 39 into the corresponding pair of grooves 44, respectively. Then, the lower projections 42 of the partition plates 39 are inserted into the grooves 43 of the bottom plate 37, respectively. Thereby, the lower end portions of the partition plate 39 contact the bottom plate 37, and the upper projections 41 are fitted to the grooves 44, respectively. In this way, the partition plates 39 are attached to the fluid passage block 32 in predetermined positions, respectively.

When the partition plates 39 are inserted into the measurement fluid passage 31 in the above-described manner, the partition plates 39 are placed so that the convex sections 56 are closer to the outlet 31b rather than the inlet 31a. In this way, the directions of the obverse surfaces 39a of the plurality of partition plates 39 conform to each other and the reverse surfaces 39b of the plurality of partition plates 39 conform to each other.

Then, the sheet 45 is attached to the fluid passage block 32 in such a way that the sheet 45 covers the opening 38, and the convex sections 56 of all of the partition plates 39 protrude upward through the downstream aperture 57 (if the partition plates 39 are placed in a correct direction). In this configuration, it can be more easily determined whether or the partition plates 39 are placed in the correct direction, by merely checking whether or not all of the convex sections 56 are located within one aperture 57.

Finally, the sensor block 33 to which the ultrasonic transducers 46, 47 and the substrate 51 are attached is attached to the fluid passage block 32. Thus, assembling of the ultrasonic flow meter device 30 is completed.

Next, the operation of the ultrasonic flow meter device 30 will be described with reference to FIGS. 1 to 3. As indicated by the arrow 55 of FIG. 1, a fluid to be detected flows into the ultrasonic flow meter device 30. The fluid is faired by the inlet wall surface 54 which is the curved surface, and introduced into each of the flat fluid passages 40 of the measurement fluid passage 31. The fluid flows into the plurality of flat fluid passages 40 with an equal distribution ratio.

In a state in which the fluid is flowing through the flat fluid passages 40, the first ultrasonic transducer 46 transmits the ultrasonic wave. The ultrasonic wave travels through the upstream aperture 57 of the sheet 45, travels obliquely across the flat fluid passages 40, and is reflected on the bottom plate 37. Then, the ultrasonic wave travels through the downstream aperture 57 of the sheet 45 and is received by the second ultrasonic transducer 47. Also, the second ultrasonic transducer 47 transmits the ultrasonic wave, the ultrasonic wave is reflected on the bottom plate 37, and the first ultrasonic transducer 46 receives the ultrasonic wave.

The measurement circuit section of the substrate 51 measures a transit time (upstream transit time) of the ultrasonic wave that passes when the first ultrasonic transducer 46 transmits the ultrasonic wave to the second ultrasonic transducer 47, and a transit time (downstream transit time) of the ultrasonic wave that passes when the second ultrasonic transducer 47 transmits the ultrasonic wave to the first ultrasonic transducer 46. The calculation circuit section calculates a flow velocity based on a difference between the upstream transit time and the downstream transit time, and derives a flow rate from the flow velocity.

In accordance with the above-described configuration, the convex sections 56 are provided on the partition plates 39 in the non-symmetric positions. By aligning the convex sections 56 of the plurality of partition plates 39 with each other, the directions of the obverse surfaces 39a of the partition plates 39 can be easily made to conform to each other and the directions of the reverse surfaces 39b of the partition plates 39 can be easily made to conform to each other. Since the convex sections 56 protrude upward through the downstream aperture 57, the positions of the convex sections 56 can be easily checked. This makes it possible to easily determine whether or not the directions of the obverse surfaces 39a of the partition plates 39 conform to each other and the directions of the reverse surfaces 39b of the partition plates 39 conform to each other. Thus, assembling of the ultrasonic flow meter device 30 can be easily carried out.

Since the partition plates 39 are placed in such a manner that the directions of the obverse surfaces 39a conform to each other and the directions of the reverse surfaces 39b conform to each other, warpage or burr generated in the partition plates 39 uniformly affects the fluid flowing along the obverse surfaces 39a or the reverse surfaces 39b of the partition plates 39. Therefore, the flow velocity distribution can be made uniform among the flat fluid passages 10. As a result, the non-uniformity of the flow rate among flow meter devices can be reduced.

The convex sections 56 protrude upward through the opening 38, and do not exist inside of the measurement fluid passage 31. For this reason, the convex sections 56 affect less the flow of the fluid in the measurement fluid passage 31. As a result, the flow rate of the fluid can be measured more accurately.

In the above-described configuration, the partition plates 39 are placed in the measurement fluid passage 31 in such a manner that the obverse surfaces 39a face the first side wall 35 and the reverse surfaces 39b face the second side wall 36. Alternatively, the partition plates 39 may be placed in the measurement fluid passage 31 in such a manner that the obverse surfaces 39a face the second side wall 36 and the reverse surfaces 39b face the first side wall 35.

In the above-described configuration, the convex sections 56 are placed to face the downstream aperture 57. Alternatively, the convex sections 56 may be placed to face the upstream aperture 57.

Figure 5:
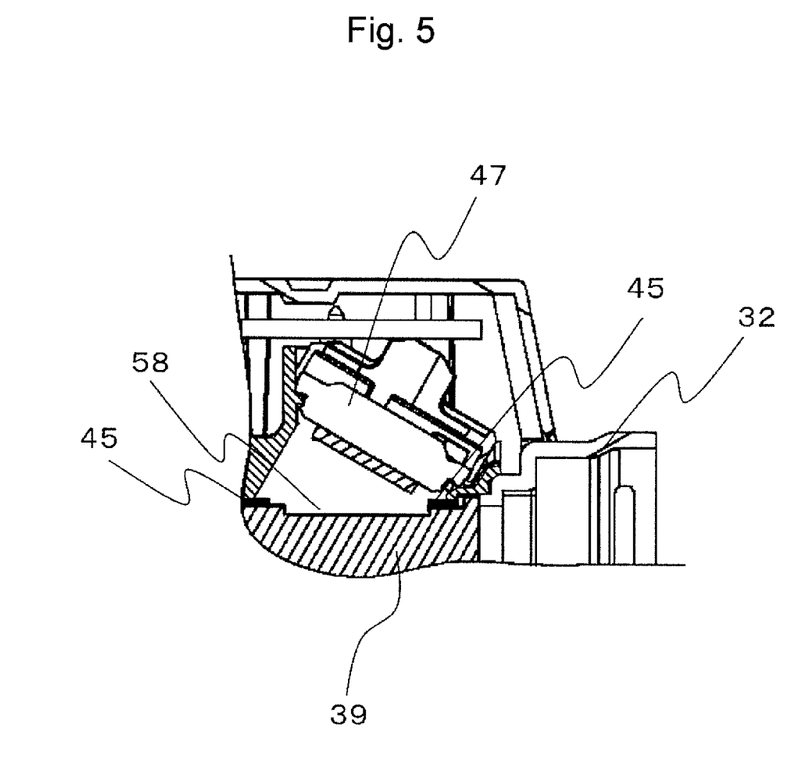
FIG. 5 is a cross-sectional view showing a portion of an ultrasonic flow meter device according to another example.

In the above-described configuration, the convex sections 56 are provided on the partition plates 39 such that the convex sections 56 protrude upward from the upper end surfaces, as identification sections, respectively. Alternatively, as shown in FIG. 5, recesses 58 may be provided in the partition plates 39 such that the recesses 58 are recessed in the upper end surfaces, respectively, as the identification sections used to identify the obverse surfaces 39a and the reverse surfaces 39b of the partition plates 39.

The recesses 58 are provided in the partition plates 39, respectively, in non-symmetric positions with respect to the center line between the upstream end and the downstream end of the partition plates 39, for example, in positions that face the downstream aperture 57. The size of the recesses 58 is set to be substantially equal to that of the aperture 57 so that the recesses 58 extend over the substantially entire region of the aperture 57. In this case, the positions of the recesses 58 can be checked through the aperture 57. Therefore, it becomes possible to easily determine whether or not the directions of the obverse surfaces 39a of the partition plates 39 conform to each other and the directions of the reverse surfaces 39b of the partition plates 39 conform to each other.

In the above-described configuration, the identification sections are provided separately from the upper projections 41. Alternatively, in addition to the function of fastening the partition plates 39, the upper projections 41 may be used as the identification sections used to identify the obverse surfaces 39a and the reverse surfaces 39b of the partition plates 39. In this case, the shapes or positions of the two upper projections 41 provided on each of the partition plates 39 may be configured to be non-symmetric to identify the obverse surface 39a and the reverse surface 39b of the partition plate 39.

In the above-described configuration, the identification sections are provided on the upper end surfaces of the partition plates 39, respectively, which face the opening 38. Alternatively, the identification sections may be provided on the lower end surfaces of the partition plates 39, respectively. In this case, for example, convex sections protruding downward from the lower end surfaces of the partition plates 39 or recesses which are recessed upward in the lower end surfaces of the partition plates 39 may be used as the identification sections, respectively.

The above described embodiments may be combined so that they do not exclude each other.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The ultrasonic flow meter device of the present invention is useful as an ultrasonic flow meter device or the like, which can reduce non-uniformity of the flow rate among flow meter devices.

What is claimed is:

1. An ultrasonic flow meter device comprising:
   a fluid passage forming section including a measurement fluid passage, and an opening facing a bottom surface of the measurement fluid passage;
   a pair of ultrasonic transducers which transmit and receive an ultrasonic wave via the opening;
   a partition plate which partitions the measurement fluid passage; and
   an identification section provided on an end surface of the partition plate and used to identify an obverse surface and a reverse surface of the partition plate.

2. The ultrasonic flow meter device according to claim 1, wherein the identification section is placed outside of the measurement fluid passage.

3. The ultrasonic flow meter device according to claim 2, further comprising:
   a sheet covering the opening,
   wherein the sheet includes a first aperture through which the ultrasonic wave transmitted from the ultrasonic transducer travels, and a second aperture through which the ultrasonic wave reflected on the bottom surface of the measurement fluid passage travels, and
   wherein the identification section is a convex section protruding through one of the first aperture and the second aperture.

4. The ultrasonic flow meter device according to claim 1, further comprising:
   a sheet covering the opening,
   wherein the sheet includes a first aperture through which the ultrasonic wave transmitted from the ultrasonic transducer travels, and a second aperture through which the ultrasonic wave reflected on a bottom surface of the measurement fluid passage travels, and
   wherein the identification section is a recess section facing one of the first aperture and the second aperture.

* * * * *